(12) United States Patent
Kato et al.

(10) Patent No.: US 6,293,531 B1
(45) Date of Patent: Sep. 25, 2001

(54) VIBRATION-DAMPING MOUNT

(75) Inventors: Hisayoshi Kato, Toyota; Tuneichi Furuie, Ichinomiya; Masanao Gotou, Hashima-gun; Tatsuo Suzuki, Inazawa; Minoru Toyoda, Hashima-gun; Tetsuya Tsuiki, Haguri-gun; Shigeki Takeo, Nagoya, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/389,054

(22) Filed: Sep. 2, 1999

(30) Foreign Application Priority Data

Sep. 2, 1998 (JP) .................................................. 10-263987

(51) Int. Cl.[7] .............................. F16F 13/00; F16F 15/00; F16F 5/00; F16F 9/00
(52) U.S. Cl. ........................................................ 267/140.12
(58) Field of Search ........................ 267/140.13, 140.12, 267/141, 140.2, 140.3, 140.4, 140.5, 141.3, 141.4, 293

(56) References Cited

U.S. PATENT DOCUMENTS

| | | | |
|---|---|---|---|
| 4,392,640 | * | 7/1983 | Kakimoto ............................ 267/141.2 |
| 4,401,198 | * | 8/1983 | Kunczynski ......................... 267/141.2 |
| 4,811,933 | * | 3/1989 | Inagaki et al. ...................... 267/140.1 |
| 5,026,031 | * | 6/1991 | Court .................................. 267/140.12 |
| 5,181,698 | * | 1/1993 | Fiene et al. ......................... 267/140.12 |
| 5,190,269 | | 3/1993 | Ikeda et al. . |
| 5,503,376 | * | 4/1996 | Simuttis et al. ..................... 267/293 |
| 5,551,675 | * | 9/1996 | Simuttis et al. ..................... 267/293 |
| 5,667,205 | * | 9/1997 | Mutoh et al. ....................... 267/140.13 |
| 5,690,320 | * | 11/1997 | Kanda ................................. 267/140.12 |
| 6,029,961 | * | 2/2000 | Meyerink et al. .................. 267/140.12 |

* cited by examiner

*Primary Examiner*—Robert J. Oberleitner
*Assistant Examiner*—Devon Kramer
(74) *Attorney, Agent, or Firm*—Pillsbury Winthrop LLP

(57) ABSTRACT

A vibration damping mount capable of reducing vibration and noise, and improving vehicle stability and controllability. Between an inner cylindrical sleeve and outer cylindrical sleeve which are coaxially arranged with each other, a vibration-damping rubber body is disposed and joined thereto. A stopper plate is secured to a lower end of the inner cylindrical sleeve. The vibration-damping rubber body extends from the lower end thereof along a flange which projects outward from a lower end of the outer cylindrical sleeve to define an annular rubber stopper. An end edge of the annular rubber stopper abuts a peripheral part of the stopper plate. A rubber spacer is disposed in an annular space defined by the rubber stopper, vibration-damping rubber body and stopper plate so as to be compressed and generate a reaction force upon obliquely applied loads due to the relative displacement between the inner sleeve and outer sleeve, thereby reducing vibration and noise with friction damping, and improving vehicle stability and controllability against the obliquely applied loads by applying an increased spring constant upwardly.

10 Claims, 5 Drawing Sheets

INSIDE WHEEL

OUTSIDE WHEEL

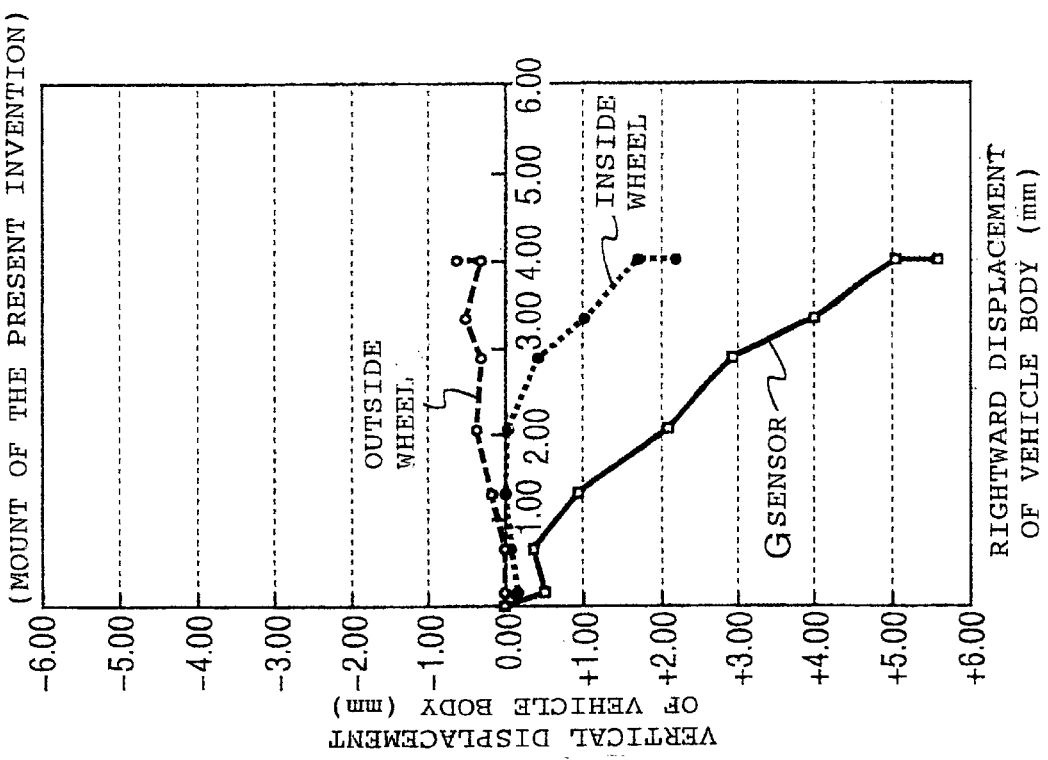
FIG. 3(a) (CONVENTIONAL MOUNT)
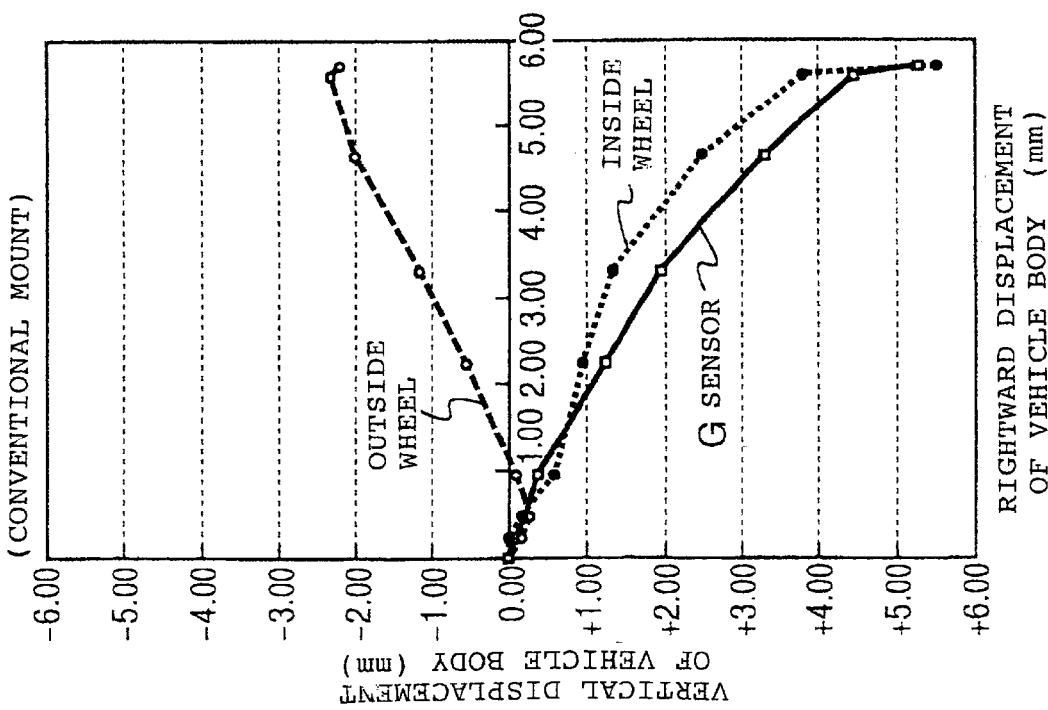
FIG. 3(b) (MOUNT OF THE PRESENT INVENTION)

VIBRATION-DAMPING MOUNT

BACKGROUND OF THE INVENTION

1. Field of the Invention

The present invention relates to a vibration damping mount for installation between a sub-frame of a vehicle suspension device and a vehicle body.

2. Description of Related Art

It is well known that a vibration-damping sub-frame structure having a vibration-damping mount disposed between a sub-frame of a vehicle suspension device and a vehicle body is effective for reducing vehicle vibration and noise. The vibration-damping mount generally includes an inner cylindrical sleeve and outer cylindrical sleeve which are coaxially arranged with each other. A vibration-damping rubber body is disposed between the inner cylindrical sleeve and outer cylindrical sleeve, and is joined thereto. The vibration-damping mount thus-arranged is installed in the vehicle by securing the inner cylindrical sleeve to the vehicle body with bolts, and fitting the outer cylindrical sleeve into an opening provided in the sub-frame. One axial end of the outer cylindrical sleeve normally bends radially outwardly to define a flange. An annular rubber stopper is formed on the flange such that an end edge of the annular rubber stopper abuts a stopper plate which is secured to one axial end of the inner cylindrical sleeve.

The above-described conventional vibration-damping sub-frame structure reduces vehicle vibration and noise, but degrades stability and controllability. This disadvantage is caused by a relative displacement occurring in the vibration-damping mount between the outer cylindrical sleeve secured to the sub-frame and inner cylindrical sleeve secured to the vehicle body. This displacement is due to a force exerted from the suspension to the sub-frame. In particular, the relative displacement occurring in the vertical direction of the vehicle affects the vehicle stability and controllability.

SUMMARY OF THE INVENTION

It is an object of the present invention to provide a vibration-damping mount capable of reducing vehicle vibration and noise, and improving vehicle stability and controllability.

A first aspect of the vibration-damping mount in accordance with the present invention includes an inner cylindrical sleeve and outer cylindrical sleeve coaxially arranged with each other, and a vibration-damping rubber body disposed between the inner cylindrical sleeve and outer cylindrical sleeve, and is joined thereto.

One axial end of the outer cylindrical sleeve projects radially outwardly to define an annular flange. An annular rubber stopper is formed on the annular flange so as to abut a stopper plate which is secured to the inner cylindrical sleeve. One axial end of the vibration-damping rubber body extends along the annular flange to define a thick-walled end which acts as the annular rubber stopper. A rubber spacer is disposed in an annular space defined by the rubber stopper, the vibration-damping rubber body and the stopper plate. In a preferred embodiment, the rubber spacer is disposed so as to abut both a bent portion of the outer cylindrical sleeve, and a facing surface of the stopper plate, so as to be compressed and generate a reaction force to the obliquely applied force caused by the relative displacement between the inner cylindrical sleeve and outer cylindrical sleeve.

The vibration-damping mount thus-arranged exhibits spring characteristics which reflect low spring constants in the frequency region corresponding to the micro displacement such as vibration and noise, and high spring constants in the frequency region corresponding to the large load generated by the operation of a steering wheel, for example.

With respect to the spring constant, the rubber spacer behaves as follows.

When a small amount of displacement occurs, offset and slippage in both a rubber-to-rubber interface between the rubber spacer and vibration-damping rubber body, and a rubber-to-metal interface between the rubber spacer and stopper plate occurs, thereby decreasing the effective spring constant. This causes the vibration-transmissibility to decrease, and consequently prevents vibration and noise.

When large loads are applied to the vehicle, such as when operating the steering wheel to make a turn, for example, an inside wheel tends to lift due to the roll movements of the vehicle. At this time, the rubber spacer is compressed and generates a reaction force, thereby increasing the spring constant. This results in the stopper plate and inner cylindrical sleeve being pressed in a downward direction to generate a force adapted to restrain the lifting of the vehicle body, thereby obtaining good vehicle stability and controllability.

With a second aspect of the vibration-damping mount in accordance with the present invention, the rubber spacer is provided separately from the vibration-damping rubber body. With this arrangement, the rubber spacer and vibration-damping rubber body can be composed of different rubber materials having different properties. Consequently, the rubber hardness of these members can be determined separately from each other; thereby facilitating the adjustment of the spring properties thereof.

In accordance with a third aspect of the vibration-damping mount of the present invention, the rubber spacer is formed integrally with the vibration-damping rubber body. For example, the rubber spacer is obtained by extending the vibration damping rubber body so as to be positioned in the space between the rubber stopper and stopper plate. With this arrangement, a rubber-to-rubber interface and/or rubber-to-metal interface can be provided, and consequently, a high spring constant can be obtained against the large oblique loads applied to the vehicle, thereby effecting operational advantages similar to those of the first aspect of the present invention.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 3(a) is a graph showing the relative displacement of the vehicle body and sub-frame upon input of loads to a vehicle provided with the conventional vibration-damping mount;

FIG. 3(b) is a graph showing the relative displacement of the vehicle body and sub-frame upon input of loads to a vehicle provided with the vibration-damping mount of the present invention;

DETAILED DESCRIPTION OF THE PREFERRED EMBODIMENTS

Figure 1A:
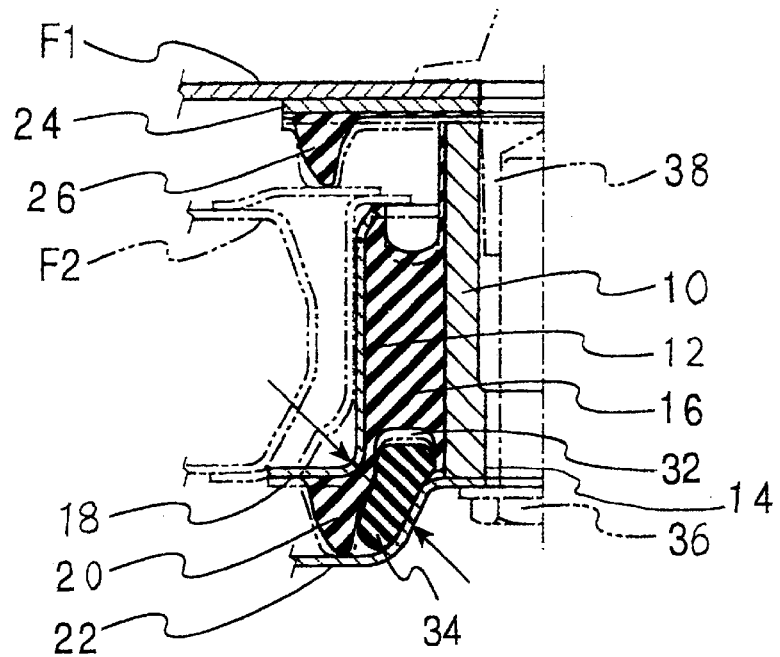
FIG. 1(a) is a partial cross-sectional view of a vibration-damping mount in accordance with a first embodiment of the present invention.
Figure 1B:
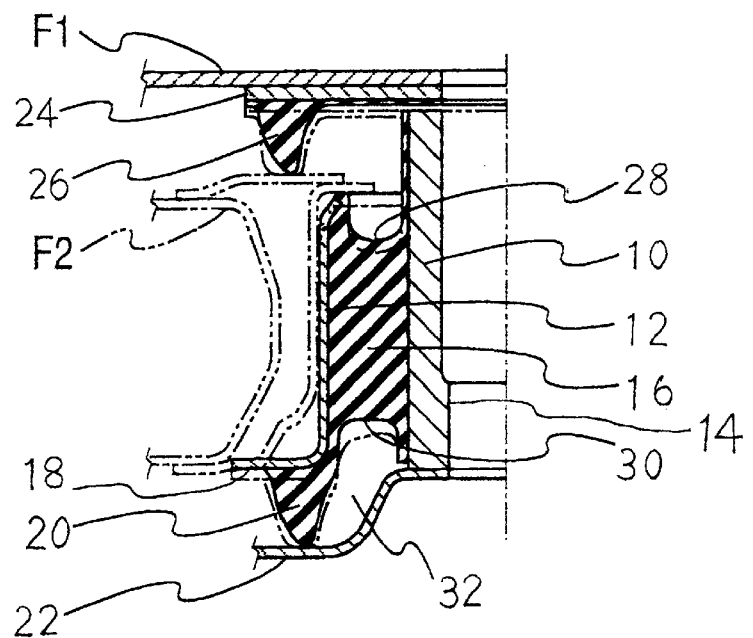
FIG. 1(b) is a partial cross-sectional view of the vibration-damping mount in accordance with the first embodiment, which illustrates the state where the rubber spacer is not provided.

FIGS. 1(a) and 1(b) show a first embodiment of a vibration-damping mount in accordance with the present invention. As shown in FIG. 1(b), around an inner sleeve 10 having a cylinder-like configuration, an outer sleeve 12 having a cylinder-like configuration is arranged coaxially with the inner sleeve 10. The inner sleeve 10 is provided with an opening 14 for use in securing the vibration-damping mount to a vehicle body.

A vibration-damping rubber body 16 is disposed between the inner sleeve 10 and outer sleeve 12 so as to be joined thereto over the entire circumference thereof.

The lower part of the outer sleeve 12 projects outwardly to define an annular flange 18. The lower peripheral part of the vibration-damping rubber body 16 extends radially outwardly along a lower surface of the annular flange 18 to define a thick-walled end as a rubber stopper 20 having a gable-like cross-section. A stopper plate 22 which has a hat-like configuration is secured to a lower end surface of the inner sleeve 10 in the central part thereof. The peripheral part of the stopper plate 22 extends in an approximately parallel relation with the lower surface of the annular flange 18, and abuts a lower end edge of the rubber stopper 20. Another stopper plate 24 is secured to an upper end surface of the inner sleeve 10. And, a rubber stopper 26 having a gable-like cross section is provided on the lower surface of the peripheral part of the stopper plate 24.

The vibration-damping rubber body 16 has annular depressions 28 and 30 in upper and lower end surfaces thereof, respectively. The lower end surface of the vibration-damping rubber body 16, in which the depression 30 is provided, the rubber stopper 20, and stopper plate 22 define an annular space 32. As shown in FIG. 1(a), a rubber spacer 34 is disposed in the annular space 32. The rubber spacer 34 generates a force in reaction to a compression caused by the oblique loads applied to the rubber spacer 34 as a result of the relative displacement of the inner sleeve 10 and outer sleeve 12. With this arrangement, vibration and noise can be reduced, and the vehicle stability and controllability can be effected. The rubber spacer 34 may be composed of the same rubber material as that of vibration damping rubber body 16 or may be a different kind. It is desirable to provide gaps between the rubber spacer 34 and a facing rubber surface such that the space 32 is not completely filled when the rubber spacer 34 is subjected to oblique load. The rubber spacer 34 may be arranged so as to abut the rubber stopper 20 which covers the lower bent part of the outer sleeve 12, and the slide surface of the stopper plate 22 (inclusive of the outer surface of the inner sleeve 10, if exposed to the space 32) and strongly held therebetween. In FIG. 1(a), for example, the rubber spacer 34 abuts the rubber stopper 20 and stopper plate 22 along its side surfaces, and gaps are provided over and under the rubber spacer 34. It is preferable to determine the space-filling rate of the rubber spacer 34 such that, when the vibration-damping mount is installed in the vehicle, and consequently, the vehicle weight is applied to the rubber spacer 34, it deforms downward and substantially fills the space 32 inclusive of the upper and lower gaps. This arrangement enables effective generation of a force which can react to the compression caused by the large loads. Furthermore, by changing the space-filling rate, a rubber hardness, a pre-compression amount (in oblique directions) or the like of the rubber spacer 34, the spring properties of the vibration-damping mount can be adjusted.

As shown in FIG. 1(a), to install the vibration-damping mount thus arranged in a vehicle, the inner sleeve 10 is secured to a vehicle body F1 by inserting a bolt 36 into the opening 14 of the inner sleeve 10 from the lower end thereof, and the outer sleeve 12 is secured to a sub-frame F2 by fitting the outer sleeve 12 into an opening provided in the sub-frame F2. The stopper plate 24 is joined to the lower surface of the vehicle body F1, and a nut 38 is provided so as to penetrate a center of the stopper plate 24 and extend into the inner sleeve 10. When the bolt 36 is inserted into the opening 14 the bolt 36 is screwed to the nut 38. In the drawings, solid lines indicate the positions of members of the vibration-damping mount before installation, and two-dot chain lines indicate the positions of the members of the vibration-damping mount after installation. After installation, the outer sleeve 12 is displaced downward with respect to the inner sleeve 10.

The vibration-damping mount thus-installed absorbs micro displacements such as that caused by vibration and noise with frictional damping, and thereby improves vehicle stability and controllability against large obliquely applied loads by applying an increased spring constant upwardly of the vehicle.

Figure 2:
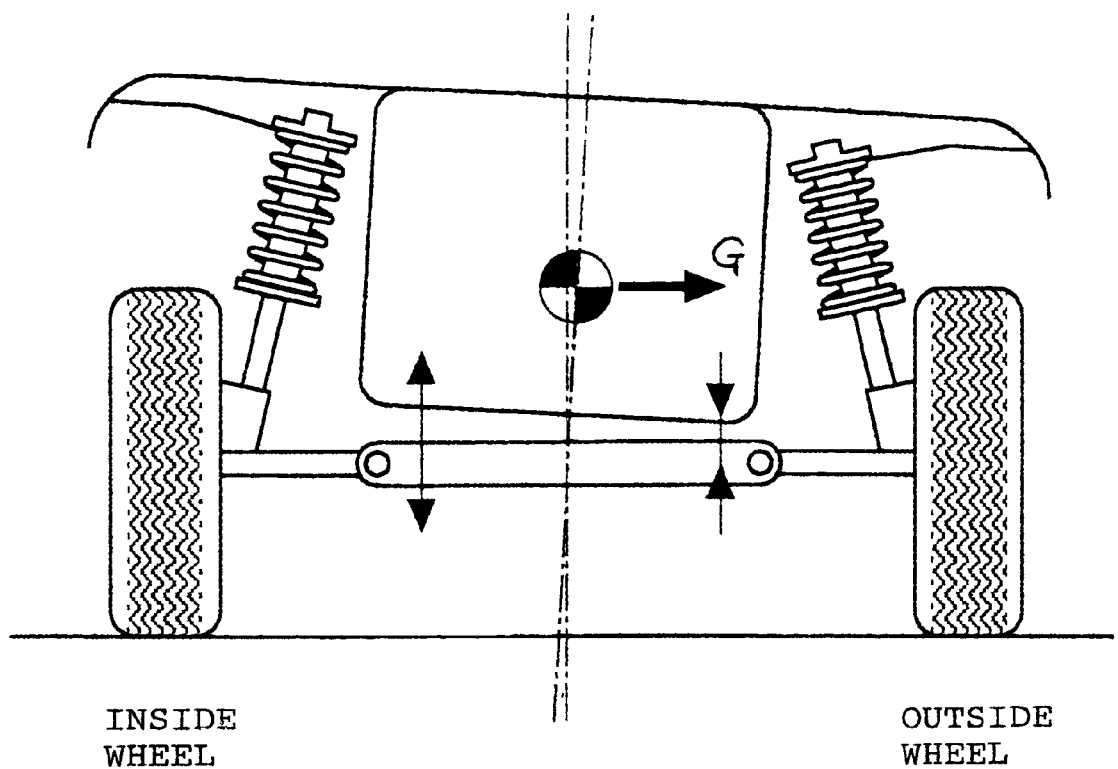
FIG. 2 is a diagram illustrating a vehicle, which is taken from a rear side thereof upon turning left.

The above-described effects will be explained with reference to FIGS. 2 to 5. FIG. 2 illustrates a vehicle, from a rear side thereof during a left turn. At this pint in time, a centrifugal force G is applied at the center of gravity of the vehicle engine. Consequently, the vehicle rolls such that an inside wheel of the vehicle is lifted from a road surface, and the outside wheel is pushed downward against the road surface. FIGS. 3(a) and 3(b) are graphs, each showing this rolling movement in terms of the relative displacement of the vehicle body and sub-frame. FIG. 3(a) shows the relative displacement of the vehicle body F1 and sub-frame F2 where the conventional vibration-damping mount having no rubber spacer is installed in the vehicle. When loads due to the leftward turning of the vehicle act (line ◇—◇), on the inside wheel side, the vehicle body F1 displaces relative to the sub-frame F2, rightward and obliquely up at approximately 45° (See FIG. 3(a)–3(b), line ●—●). Whereas, on the outside wheel side, the vehicle body displaces relative to the sub-frame, rightward and obliquely down at approximately 45° (See FIG. 3(a)–3(b), line ○—○). FIG. 3 shows the relative displacement of the vehicle body F1 and sub-frame F2 where the vibration-damping mount of the present embodiment is installed in the vehicle. As shown in FIG. 3(b), when the loads due to the leftward turning of the vehicle are small, the vehicle body F1 displaces only rightward and leftward. There is not much vertical displacement. However, as the rightward displacement of the vehicle body F1 increases, the vehicle body F1 also displaces vertically.

However, the amounts of the vertical displacements are greatly decreased on both the inside wheel side and the outside wheel side, as compared to the case using the conventional vibration-damping mount shown in FIG. 3(a). This effect is caused by the vibration-damping mount of the present embodiment generating such a force as to press down the vehicle body when loads are generated in the oblique directions shown by the arrows in FIG. 1(a) due to the rolling movement of the vehicle. The force generated by the vibration-damping mount of the present embodiment is considered to restrain the inside wheel from being lifted due to the rolling movement of the vehicle, thereby greatly improving the vehicle stability and controllability.

Figure 4:
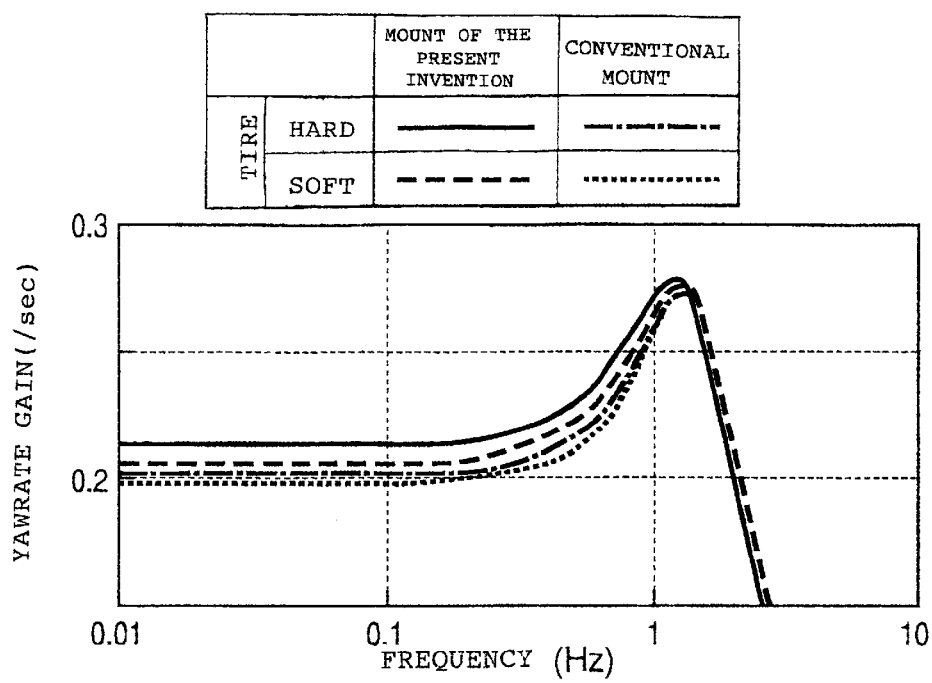
FIG. 4 is a graph showing the vehicle stability and controllability with the vibration-damping mount in accordance with the present invention in comparison with that of the conventional vibration-damping mount.

FIG. 4 shows the test results of the vehicle stability and controllability. The vibration-damping mounts of the present embodiment and of the conventional arrangement are respectively installed in actual vehicles, and the response characteristics (yawrate gain [/sec]) in a predetermined frequency range were measured. And the response characteristics at specific frequencies less than 1 Hz were shown along with those of the conventional vibration-damping mount. It is well known that, by decreasing the hardness of the tires, vibrations can be reduced. So, the measurements were performed using vehicles provided with two kinds of tires each having a different tire hardness.

Figure 5:
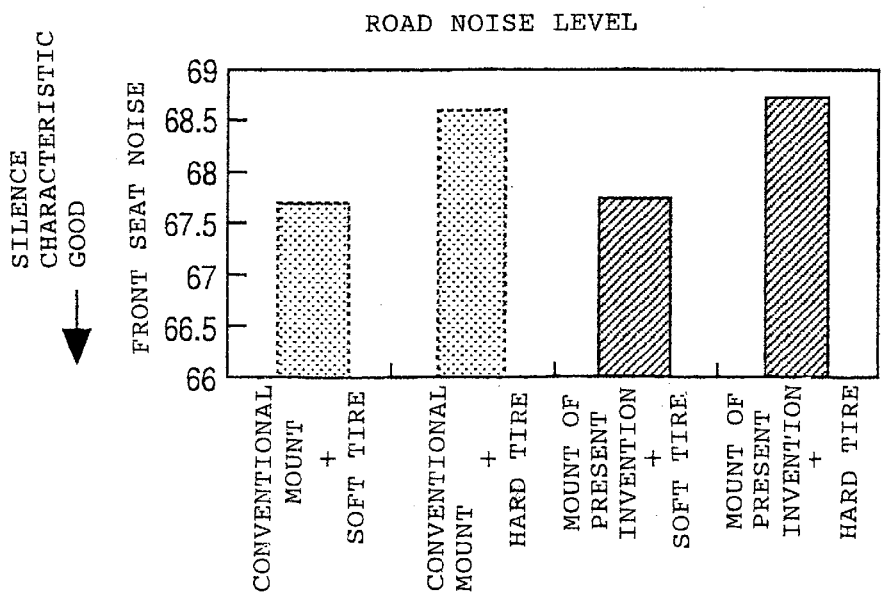
FIG. 5 is a graph showing the vibration-damping effect with the vibration-damping mount in accordance with the present invention in comparison with that of the conventional vibration-damping mount.

As is apparent from FIG. 4, the vibration-damping mount of the present embodiment exhibits improved response characteristics, as compared to the conventional vibration-damping mount irrespective of the hardness of the tires. In particular, it is known that when soft tires are used, vehicle stability and controllability decrease. However, where the vibration-damping mount of the present embodiment is applied to a vehicle provided with soft tires, high response characteristics are obtained, compared with the case where the conventional vibration-damping mount is applied to the vehicle provided with hard tires. These measurement results show that by virtue of the rubber spacer 34, the vehicle stability and controllability are greatly improved. Furthermore, as shown in FIG. 5, the vibration damping mount according to the first embodiment does not degrade the damping effect against micro displacements such as vibration and noise.

As described above with the vibration-damping mount of the first embodiment, the vehicle stability and controllability can be improved without degrading the damping effect of vibration and noise, such as road noise.

Figure 6:
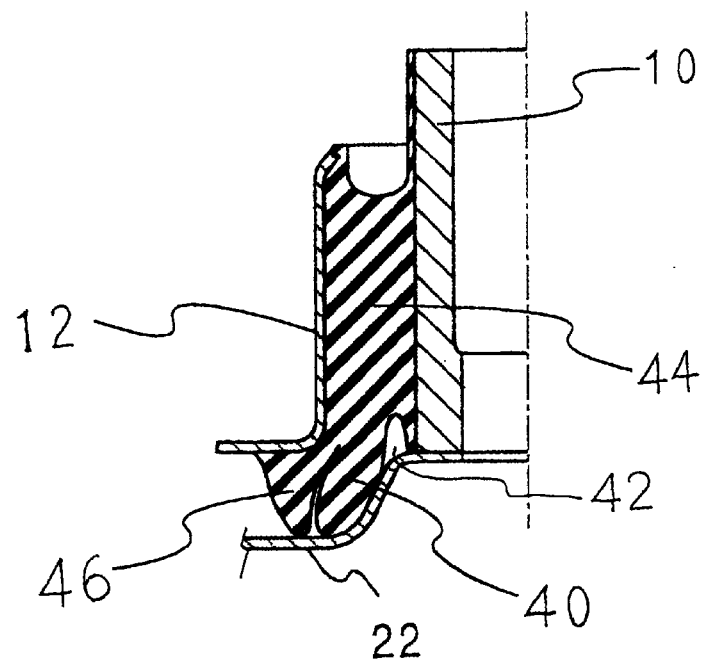
FIG. 6 is a partial cross-sectional view of a vibration-damping mount in accordance with a second embodiment of the present invention.

FIG. 6 illustrates a second embodiment of the vibration-damping mount in accordance with the present invention. As shown, a rubber spacer part 40 is disposed in a space 42 defined by a vibration-damping rubber body 44, rubber stopper 46 and stopper plate 22. The rubber spacer part 40 has a configuration similar to that of the rubber spacer 34 of the first embodiment, and is formed integrally with the vibration-damping rubber body 44. The rubber spacer part 40 is provided between the rubber stopper 46 and stopper plate 22, such that when loads are generated in oblique directions, the outer side surface of the rubber spacer part 40 abuts the rubber stopper 46 and the inner side surface abuts the stopper plate 22; the rubber spacer part 40 is held strongly thereby. At this time, the rubber spacer part 40 is compressed to generate a reaction force. It is preferable that, when the rubber spacer part 40 is disposed in the space 42, gapes are formed between the rubber spacer part 40 and facing rubber surfaces, and when the vibration-damping mount thus arranged is installed in the vehicle, the rubber spacer part 40 nearly completely fills the space 42 without leaving any gap. The gaps are provided so as not to affect the compression of the rubber spacer part 40, and the generation of reaction forces. In FIG. 6, the gaps are provided between a lower outer surface of the rubber spacer part 40 and rubber stopper 46, and between an upper inner surface of the rubber spacer part 40 and a facing part of the vibration damping rubber body 44, which covers the outer surface of the inner sleeve 10.

Where the rubber spacer and vibration-damping rubber body are composed of the same material, this arrangement may be adopted. With this arrangement, molding and installation works are facilitated.

According to a second embodiment, a rubber-to-rubber interface is provided between the rubber spacer part 40 and rubber stopper 46, and a rubber-to-metal interface is provided between the rubber spacer part 40 and stopper plate 22, whereby vibration transmissibility can be decreased. Furthermore, when loads are generated, in oblique directions, the rubber spacer part 40 is compressed consequently, the stopper plate 22 is pressed downward, thereby generating a downward load to restrain the relative displacement between the sub-frame and vehicle body. Thus, the operational advantages of reducing vibration and noise, and improving a vehicle stability and controllability, can be obtained, similarly to the first embodiment.

Figure 7:
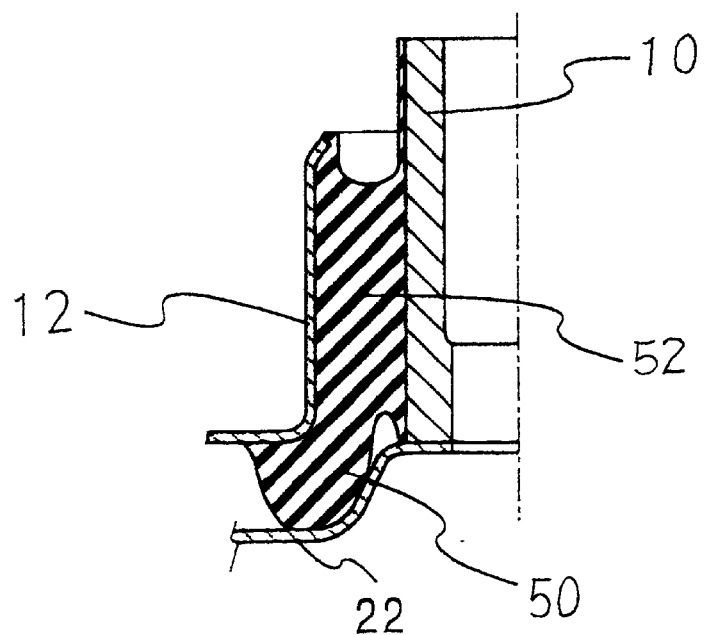
FIG. 7 is a partial cross-sectional view of a third embodiment of a vibration damping mount in accordance with the present invention.

FIG. 7 illustrates a third embodiment of the vibration-damping mount in accordance with the present invention. The vibration-damping mount of the present embodiment is not provided with such a rubber-to-rubber interface as is provided between the rubber spacer part 40 and rubber stopper 46 of the second embodiment (FIG. 6). A rubber spacer part 50 which is integrally formed with a vibration-damping rubber body 52 also serves as the rubber stopper. In accordance with the third embodiment, a rubber-to-metal interface is provided between the rubber spacer part 50 and stopper plate 22. Where the rubber-to-metal interface achieves a sufficient operational effect of decreasing the vibration transmissibility with friction damping therein, the rubber-to-rubber interface need not necessarily be provided. With this arrangement, molding and installation works are further facilitated.

The remainder of the structure of the vibration-damping mount according to the third embodiment is identical to that of the second embodiment. The dimensions of the gap are adjusted between the upper inner surface of the rubber spacer part 50 and its facing surface of the vibration-damping rubber body 52. With this arrangement, when loads are generated in oblique directions, the rubber spacer part 50 is compressed, and the stopper plate 22 is pressed in a downward direction; thereby generating a load directed in a downward direction and restraining the relative displacement between a vehicle body and sub-frame. Thus, the operational effects of reducing vibration and noise, and improving the vehicle stability an controllability, can be obtained, similarly to the first and second embodiments.

In the preceding embodiments, the rubber spacer is provided on the side of the lower axial end of the vibration-damping rubber body. Alternatively, the rubber spacer may be provided on the side of the upper axial end thereof. With this arrangement, the relative vertical displacement between the inner sleeve and outer sleeve can be decreased, and consequently, the spring constant can be increased in a high range, similarly to the preceding embodiments, whereby both a reduction in vibration, and an improvement in vehicle stability and controllability are effected. Furthermore, the rubber spacer may be provided on both sides of the upper and lower axial ends of the vibration-damping rubber body.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A vibration-damping mount comprising:

an inner cylindrical sleeve;

an outer cylindrical sleeve coaxially arranged with the inner cylindrical sleeve;

a vibration-damping rubber body disposed between said inner cylindrical sleeve and outer cylindrical sleeve, and joined thereto;

an annular flange projecting outward from one axial end of said outer cylindrical sleeve;

an annular rubber stopper formed on a surface of said flange;

a stopper plate secured to said inner cylindrical sleeve, said annular rubber stopper abutting a peripheral edge of said stopper plate, one axial end of said vibration-damping rubber body extending along said flange of said outer cylindrical sleeve to define a thick-walled end which acts as said annular rubber stopper; and a rubber spacer disposed in an annular space defined by said rubber stopper, vibration-damping rubber body and stopper plate so as to abut said stopper plate, said rubber spacer and said stopper plate decreasing vibration transmissibility by friction damping, and said rubber spacer being compressed and generating a reaction force upon being subjected to a relative displacement between said inner cylindrical sleeve and outer cylindrical sleeve in oblique directions.

2. A vibration-damping mount as claimed in claim 1, wherein said rubber spacer is separated from said vibration-damping rubber body.

3. A vibration-damping mount as claimed in claim 1, wherein said rubber spacer is integral with said vibration-damping rubber body such that said axial end of said vibration-damping rubber body projects into said space and is positioned between said rubber stopper and said stopper plate to define said rubber spacer.

4. A vibration-damping mount as claimed in claim 1, wherein gaps are defined between said rubber spacer and at least one of said rubber stopper and said vibration-damping rubber body, such that said annular space is not completely filled with said rubber spacer when said mount is installed in a vehicle.

5. A vibration-damping mount as claimed in claim 1, wherein said rubber spacer is arranged so as to abut said rubber stopper and said stopper plate, and is fixedly held therebetween.

6. A vibration-damping mount as claimed in claim 1, wherein said rubber stopper has a gable-like cross-section, a bottom of said rubber stopper is joined to said flange, and an end edge of said rubber stopper abuts said stopper plate.

7. A vibration damping mount as claimed in claim 1, wherein said inner cylindrical sleeve is secured to a vehicle body, and said outer cylindrical sleeve is secured to a sub-frame of a vehicle suspension device.

8. A vibration-damping mount as claimed in claim 7, wherein a central part of said stopper plate is secured to one axial end of said inner cylindrical sleeve on the side of said flange, and the other axial end of said inner cylindrical sleeve is secured to the vehicle body.

9. A vibration-damping mount as claimed in claim 7, wherein said rubber stopper is disposed between the vehicle body and sub frame of the vehicle suspension device.

10. A vibration-damping mount comprising:

an inner cylindrical sleeve;

an outer cylindrical sleeve coaxially arranged with the inner cylindrical sleeve;

a vibration-damping rubber body disposed between said inner cylindrical sleeve and outer cylindrical sleeve, and joined thereto;

an annular flange projecting outward from one axial end of said outer cylindrical sleeve;

an annular rubber stopper formed on a surface of said flange;

a stopper plate secured to said inner cylindrical sleeve, said annular rubber stopper abutting a peripheral edge of said stopper plate, one axial end of said vibration-damping rubber body extending along said flange of said outer cylindrical sleeve to define a thick-walled end which acts as said annular rubber stopper; and a rubber spacer disposed in an annular space defined by said rubber stopper, vibration-damping rubber body and stopper plate in a facing relationship with said stopper plate so as to abut said stopper plate, said rubber spacer and said stopper plate decreasing vibration transmissibility by friction damping, and said rubber spacer being compressed and generating a reaction force upon being subjected to a relative displacement between said inner cylindrical sleeve and outer cylindrical sleeve in oblique directions.

* * * * *